United States Patent [19]

Simuni

[11] Patent Number: 5,146,203

[45] Date of Patent: Sep. 8, 1992

[54] AUTOMOBILE FOR RACING

[76] Inventor: Leonid Simuni, 1056 Neilson St., Apt. 6 A, Far Rockaway, N.Y. 11691

[21] Appl. No.: 598,058

[22] Filed: Oct. 15, 1990

[51] Int. Cl.$^5$ ............ B60C 23/00; F02M 27/00; B60J 1/00; F01N 1/08
[52] U.S. Cl. .................. 340/443; 73/146.2; 250/560; 123/537; 296/180.1; 181/272; 181/258; 180/903
[58] Field of Search .......... 73/146.5, 146.2, 146.4; 123/538, 537, 536; 296/180.1, 180.5; 181/265, 266, 268, 269, 272, 258; 244/2, 48; 340/442, 443; 180/903; 116/34 R; 250/560

[56] References Cited

U.S. PATENT DOCUMENTS

| 1,895,750 | 1/1933 | Brown | 296/180.5 |
| 2,216,763 | 10/1940 | Boyce | 181/269 |
| 2,923,494 | 2/1960 | Strong | 244/2 |
| 2,932,370 | 4/1960 | Kraus | 188/300 |
| 4,149,862 | 4/1979 | Sewell | 181/258 |
| 4,460,516 | 7/1984 | Kapitanov | 123/537 |
| 4,578,992 | 4/1986 | Galasko | 73/146.5 |
| 4,605,523 | 8/1986 | Smillie | 123/537 |
| 4,912,077 | 3/1990 | Lachman et al. | 502/349 |
| 4,953,393 | 9/1990 | Galasko | 73/146.5 |

FOREIGN PATENT DOCUMENTS

| 0323121 | 11/1918 | Fed. Rep. of Germany | 180/903 |
| 2259539 | 12/1972 | Fed. Rep. of Germany | 181/258 |
| 0614703 | 12/1926 | France | 180/903 |
| 0253265 | 11/1986 | Japan | 296/180.1 |
| 2226434 | 6/1990 | United Kingdom | 340/442 |

Primary Examiner—Charles A. Marmor
Assistant Examiner—Paul Dickson

[57] ABSTRACT

An automobile for racing comprises a body, an engine, wheels, a fuel system, an exhaust system and wings having an adjustable angle of attack arranged so as to provide an upwardly directed force in the rear part of the automobile for racing and to create a turning moment relative to the front wheel axle in order to increase the maximum speed during racing by reducing friction of the automobile. Wings are arranged so as to create a turning moment relative to the front wheel axle and to lift the automobile or to provide aerodynamic braking by a remote control system. The wings are adapted to provide maneuvering of the automobile by aerodynamic braking separately of each wing. A fuel system of the automobile comprises a device for energizing the air-fuel mixture adapted to reduce the consumption of fuel. The automobile for racing comprises a tire inflation detection system adapted to inform an occupant of the automobile when the inflation pressure of any tire is reduced.

6 Claims, 3 Drawing Sheets

AUTOMOBILE FOR RACING

BACKGROUND OF THE INVENTION

1. Field of the Invention

The present invention relates to the automobiles for racing (AFR).

2. Prior Art

AFR are produced in great variety of constructions.

The maximum speed of AFR is limited in result of utilization of anti-lift devices. Aerodynamic anti-lift devices have been previously used on land vehicles for purposes of creating a generally downwardly-directed force in order to compensate for the vehicle's tendency to lift during certain operating conditions.

Attempts have been made in the past to increase the maximum speed of AFR by utilization of aerodynamic devices.

The fuel system of AFR does not include device for reducing the fuel consumption by ionization and acceleration of the air-fuel mixture.

Existing AFR are not provided with the tire inflation detection system (TIDS).

SUMMARY OF THE INVENTION

Accordingly, this invention has as a main object to increase the maximum speed of AFR up to 300 MPH by utilization of WHAAA.

Another object is to have WHAAA of such construction so as to provide the aerodynamic braking in order to improve maneuverability of AFR.

A further object of this invention to reduce the fuel consumption by ionization and acceleration of the air-fuel mixture.

It is a further object of the invention to provide a tire inflation detection system to inform an occupant of AFR when the inflation pressure of a tire is reduced.

The novel features of the present invention are set in particular in the appended claims.

The invention itself, however, both as to its construction and its manner of operation will be best understood from the following description of a preferred embodiment which is accompanied by the following drawings illustrating the invention.

DESCRIPTION OF A PREFERRED EMBODIMENT

Figure 1:
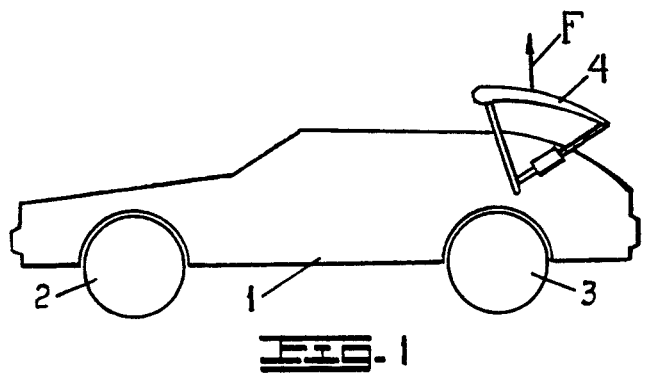
FIG. 1 is a side view of an AFR.

An AFR in accordance with the present invention has the passenger car body which is identified as a whole with reference numeral 1. Known units are arranged in in the body 1, such as, for example, an engine, a transmission, a steering, etc. The car has front wheels 2 and rear wheels 3. In the region of the rear part of body 1, it is provided with a wings 4 and 17.

The wings preferably are arranged above the body 1, so as to be accessible to a free flow of air. The wings 4, 17 are designed and arranged so that during driving of the AFR air acts upon the wings and produces an upwardly directed force F on the wings.

The specific shape of the wing is not discussed here in detail since such wings are well known, for example, in aviation.

The wings 4, 17 are connected with the body of the AFR. Therefore, when the forces F urges the wings 4, 17 upwardly, the whole rear part of the AFR is urged upwardly under the action of this force.

As a result, the weight of the AFR in this region is reduced and its speed is increased with less fuel consumption.

Wings 4 and 17 are arranged so as to create a turning moment relative to the front wheel axle in order to increase the maximum speed during racing by reducing friction. An AFR provides the maximum speed up to 300 MPH when the rear wheels are disengaged from the run-way (for the AFR having the front wheel drive). Wings 4 and 17 are adapted to provide the upwardly directed force F or to provide the aerodynamic braking by the remote control system of the AFR having the cylinder-piston units 16.

A driver can adjust only one wing in braking position to speed up any maneuver and to provide the safety maneuvering.

Figure 2:
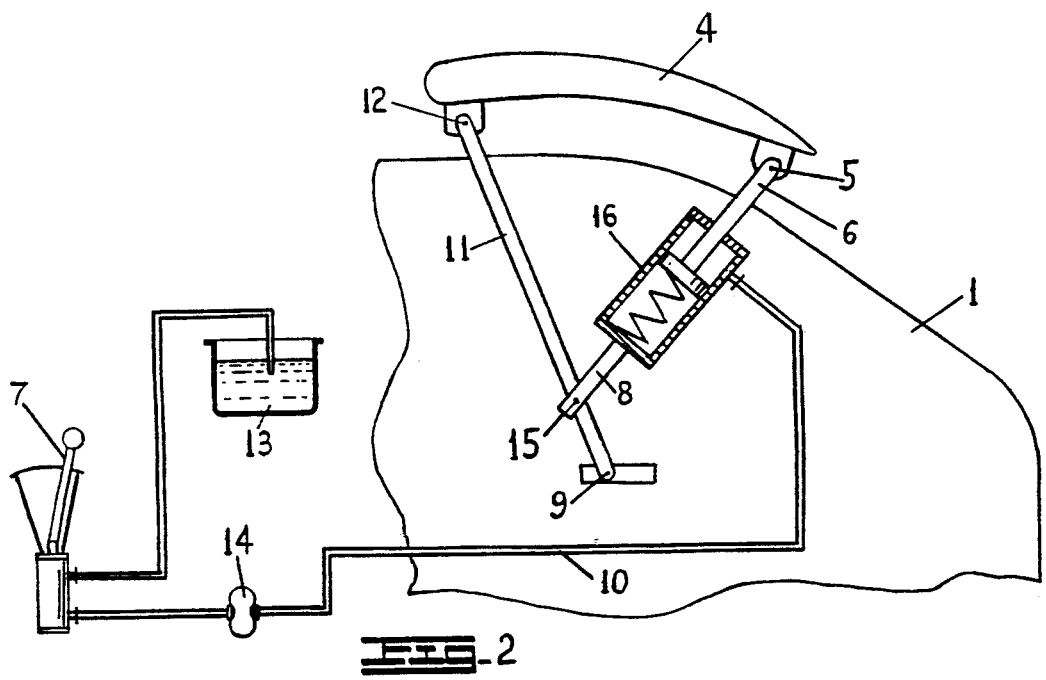
FIG. 2 is a schematic view which shows a remote control system.
Figure 3:
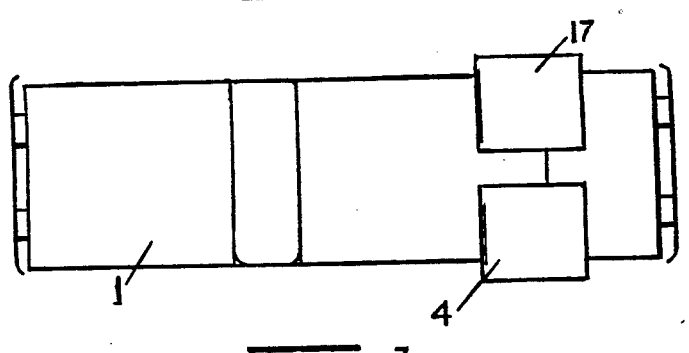
FIG. 3 is a plan view of an AFR.
Figure 4:
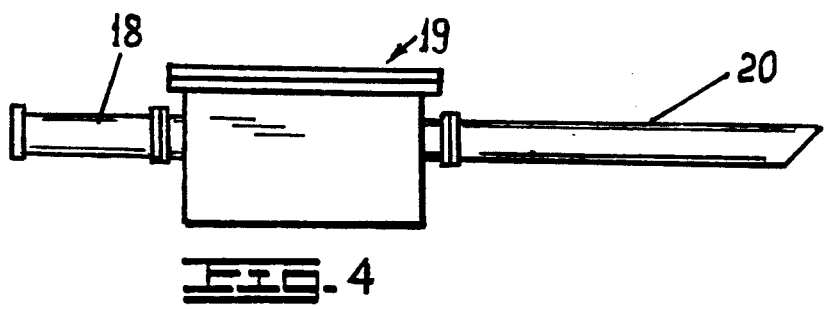
FIG. 4 is a scheme of an exhaust system of an AFR.
Figure 5:
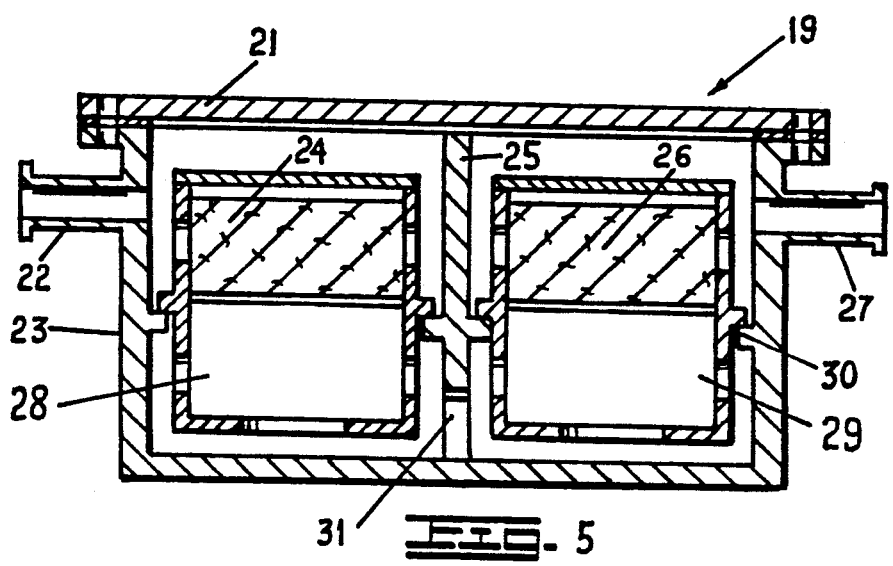
FIG. 5 is a cross-section of a cleaning device-muffler.
Figure 6:
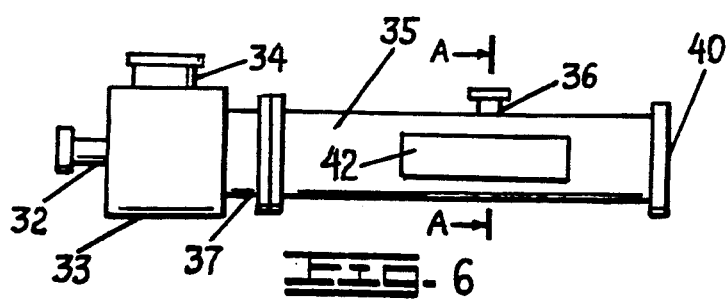
FIG. 6 is a scheme of a fuel system having the energizing device.
Figure 7:
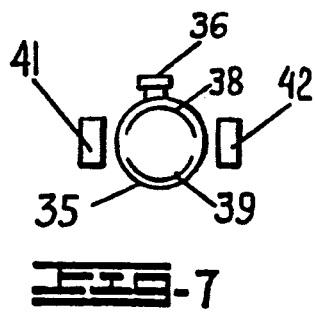
FIG. 7 is a cross-section taken on the line A—A of FIG. 6.

In accordance with the present invention the position of the wings relative to the body 1 of the AFR can be adjusted. An example of such adjustment is shown in FIG. 2.

Each wing is provided with a first supporting element 11 which is pivotally connected to the wing in a point 12 and connected to the body 1 of the AFR in a point 9. A second supporting element is pivotally connected to the each wing in a point 5 which is spaced from the point 12, and is also pivotally connected with the first supporting element 11 in a point 15. The second supporting element comprises the lever 8, the hydraulic cylinder-piston unit 16 having the movable piston connected to rod 6. The cylinder 16 is connected to the control member 7 by means of the pipe 10. The control member 7 can be arranged on the control panel of the AFR. By operating the control member 7, a driver changes the pressure of the fluid supplied by the pump 14 from a vessel 13 to the cylinder-piston unit. The cylinder-piston unit 16 changes the position of the wing 4 or the wing 17 by the rod 6. The pneumatic, mechanical or electro-mechanical systems also may be used for adjusting the position of the wings 4 and 17. The position of each wing may be adjusted so as to produce the lifting force F or the aerodynamic braking. Each wing has the separate remote control system.

The exhaust system of AFR comprises the cleaning the device-muffler (CDM) 19 connected to the exhaust pipe 18 by inlet 22. The outlet 27 of the CDM is connected to the exhaust system 20 of the AFR. The CDM comprises a container 23, a cover 21 and a partition 25 having openings 31 in the lower part. The partition 25 forms two chambers inside of the container 23.

First chamber has filters 24, 28; second chamber has filters 26, 29. Filters 24, 26 made of absorbing material such as polyyrethane foam for the removal of detrimental matter from exhaust gases for example lead, carbon, dust. Filters 28, 29 made of adsorbing material such as the pressed powder of titanium, the porous coal or other adsorbent so as to adsorb the hydrogen from the hydrocarbons and to decompose the hydrocarbons. Filters 24 and 26 are located on the top of filters 28, 29. Filters 24, 28 and filters 26, 29 are united in the section. Each section is supported by shoulders 30. These sections are removable and replaceable. The CDM is arranged so that the exhaust gases are forced to pass through the each filter in the first chamber, to detour the vertical partition through the openings 31 and to pass the each filter in the second chamber before exiting the CDM.

The exhaust gases are caused to decompose the hydrocarbons and to give up and deposite the detrimental matter such as carbon, dust, lead by passing through filters.

The exhaust gas inlet means 22 and the treated gas outlet means 27 are associated with a container 23.

A CDM provides the removal of detrimental matter from the exhaust gases and serves as muffler. The exhaust gas exiting a CDM contains much less hazardous components.

An AFR according to present invention comprises an improved fuel system having a device for energizing the air-fuel mixture (DEAFM) adapted to reduce the consumption of fuel. A DEAFM provides both an ionization and an acceleration of the air-fuel mixture.

The fuel system of AFR comprises the carburettor 33 and the air-fuel pipe 35. The carburettor 33 has an inlet 32 for introducing a fuel, an inlet 34 for introducing an air and an outlet 37 for the air-fuel mixture. An outlet 37 connected to DEAFM comprising the air-fuel pipe 35, the electrodes 38, 39 and permanent magnets or electromagnets 41, 42. Magnets 41, 42 are arranged outside of the pipe 35 or inside of the pipe 35 made of non metal compound.

The fuel pump is not shown. The air-fuel mixture is conducted in the combustion chambers (not shown) by outlet 40. The insulating box 36 is fixed to the air-fuel pipe 35 for introducing cables to electrodes 38 and 39 from the source of electro-energy. Cables and source of electro-energy are not shown.

Electrodes 38, 39 and magnets 41, 42 are arranged so as to accelerate the air-fuel mixture according to "left hand rule" of physics.

Electrodes of positive and negative polarity 38 and 39 having electro-feeding to produce the electro-current for ionization of the air-fuel mixture are formed in a cylindrical shape inside and along the air-fuel pipe 35 and arranged so as to produce an interaction of the magnetic field and electro-current results both in the ionization and acceleration of the air-fuel mixture.

An acceleration according to the law of Physics is directly proportional to the magnetic field strength and the current density.

The AFR according to the present invention comprises a tire inflation detection system (TIDS).

Known in the art TIDS having electrical sensors attached to the inside of a tire are not resulted in workable devices. Various sensors are designed to increase the reliability of TIDS.

Figure 8:
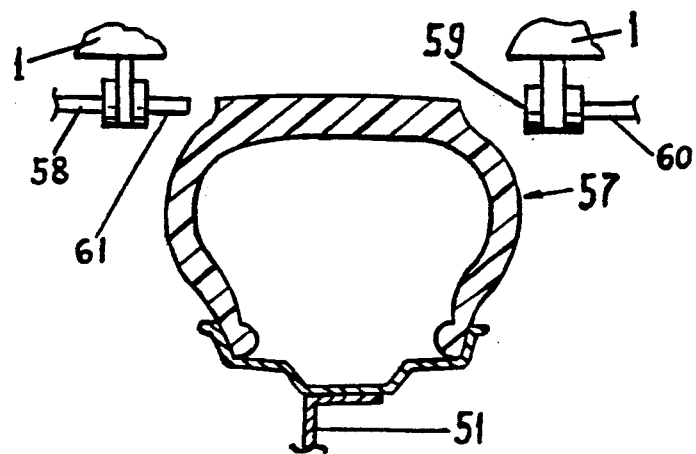
FIG. 8 is a cross-section of a tire having a photo-electric sensor cooperating with a tire inflation detection system (TIDS)
Figure 9:
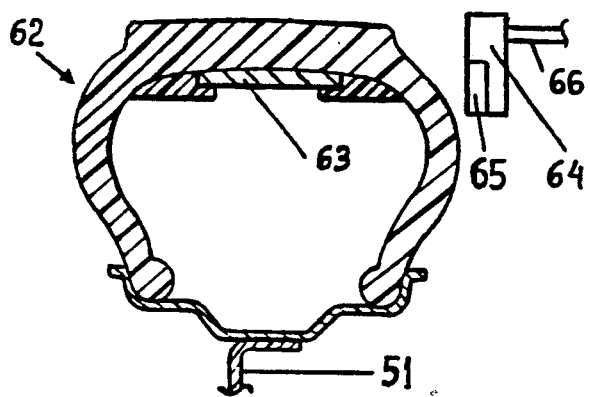
FIG. 9 is a cross-sectional view of the tubeless tire having a magnetic sensor.
Figure 10:
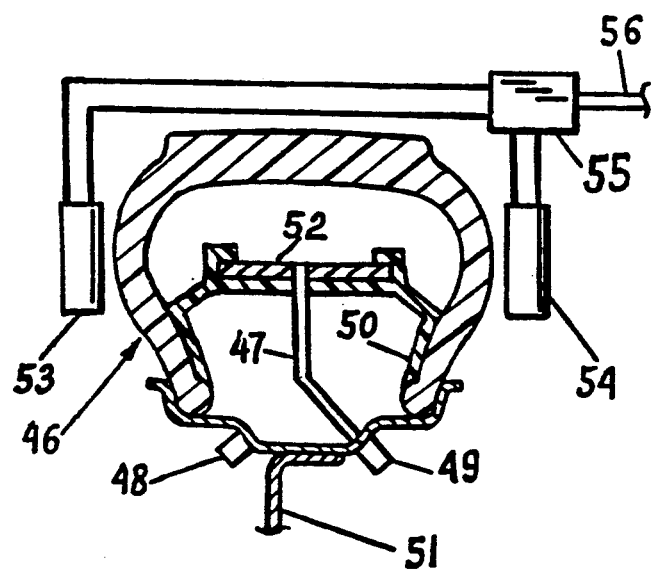
FIG. 10 is a cross-sectional view of a tire having a radioactive sensor cooperating with a TIDS.

FIGS. 8–10 show the various modifications of TIDS. A sensor 52 it is flexible, magnetic, cylindrical body made of magnetic metal or magnetic compound. Such compound is made of rubber or synthetic resin having particles of permanent magnets pressed into the compound.

A sensor 52 is fixed to the partition 50 by means of vulcanization or may be bonded to the outer face of partition 50 and fixed by means of protective ribs on its edges. The partition 50 is located between walls of tire 46 and extends to the rim assembly 51 forming two separate chambers with separate valves 48, 49 on the rim assembly to inflate each chamber separately. The pipe 47 is connected to the valve 49 for inflating the outer chamber. A position of sensor 52 depends on the inflation pressure in both chambers.

A position of sensor 52 will be changed relatively to coils 53, 54 when the inflation pressure of a tire 46 is reduced. Coils 53 and 54 are attached to the body 1 near of the top of each tire and are arranged on opposite sides of each tire. Coils 53 and 54 are connected to the transmitting electrical device 55 by cables. A movement of sensor 52 will induce the faradaic electric current in the device 55 adapted to inform an occupant of the automobile when the inflation pressure of a tire 46 is reduced. The device 55 is connected to the means of signalization by cable 56.

A sensor 63 it is flexible, cylindrical body which is made of rubber or the synthetic resin having the particles of radioactive elements for the interaction with the transmitting electrical device 64. Device 64 is attached to the body 1 near the top of tubeless tire 62. The device 64 comprising the sensitive element 65 adapted for interaction with the sensor 63.

A sensor 63 is fixed by means of protective ribs to the innere portion of a tire 62. The position of sensor 63 will be changed relative to the device 64 when the inflation pressure of a tire 62 is reduced. This causes an interaction between a sensor 63 and the sensitive element 65 connected to the transmitting electrical device 64 adapted to inform an occupant of the automobile when the inflation pressure of a tire 62 is reduced. The device 64 is connected to the means of signalization by cable 66.

The most simple construction of TIDS comprising a sensor having a source of electro-light having electro-feeding by cable 58 connected to a source of electro-energy. This TIDS comprising the photo-electric sensor 59 for producing an electrical current and the electrical transmitting device (ETD) for providing information regarding the inflation of a tire 57. The source of electro-light 61 and the photo-electric sensor 59 are attached to the body 1 near the top of each tire and are arranged on opposite sides of each tire. The photo-electrical sensor 59 adapted to provide information to the electrical transmitting device regarding the inflation of a tire 57 by means of interaction with a source of electro-light when the inflation pressure of a tire 57 is reduced. The electrical transmitting device adapted to inform an occupant of the automobile when the inflation pressure of a tire 57 is reduced. The photo-electric sensor 59 is connected to ETD (not shown) by cable 60.

A device for energizing the air-fuel mixture and the cleaning device-muffler according to present invention are adapted to be used with any power plant having a fuel system and an exhaust system.

The above operations of AFR are summarized as follows:

The wings 4, 17 are operated so as to lift the AFR in order to provide the high speed racing without disengaging the rear wheels from the run-way.

The wings 4, 17 are operated so as to create the turning moment relative to the front wheels axle in order to produce the maximum speed during racing by reducing the friction of the AFR. The maximum speed is up to 300 MPH for the AFR having the front wheel drive.

The wings 4, 17 are operated so as to provide the aerodynamic braking of the AFR.

The wings 4, 17 are operated so as to provide maneuvering by utilization of aerodynamic braking.

A device for energizing the air-fuel mixture is operated to reduce the consumption of fuel.

A cleaning device-muffler is operated to clean the exhaust gases.

A tire inflation detection system is operated to inform an occupant of the automobile when the inflation pressure of a tire is reduced.

Moreover, having thus described the invention, it should be apparent that numerous structural modifications are contemplated as being part of this invention as set forth hereandabove and as defined hereandbelow by the claims.

What is claimed is:

1. An automobile for racing comprising a body, an internal combustion engine having a fuel system, an exhaust system, tires, wings having an adjustable angle of attack, and a tire inflation detection system for said tires, said tire inflation detection system comprising:

a source of electro-light having electro-feeding, a photo-electric sensor for producing an electrical current, an electrical transmitting device for providing information regarding the inflation of each of said tires, said source of electro-light and said photo-electric sensor are attached to the body near the top of each tire and are arranged on opposite sides of each tire, said photo-electric sensor adapted to provide information to the electrical transmitting device regarding the inflation of a said tire by means of interaction with said source of electro-light when the inflation pressure of a said tire is reduced, and said electrical transmitting device adapted to inform an occupant of the automobile when the inflation pressure of a said tire is reduced.

2. An automobile for racing as claimed in claim 1 wherein said wings have an aerodynamic shape and are adapted to be mounted on a rear portion of said automobile separately on the left and right side of said body and above said body.

3. An automobile for racing as claimed in claim 2 wherein said wings are provided with a remote control to adjust the angle of attack of said wings separately.

4. An automobile for racing as claimed in claim 3, wherein said wings are adapted both for producing lifting forces to lift said rear portion of said automobile and for producing an air drag for braking action, said forces are applied to each side of said rear portion of said automobile.

5. An automobile for racing as claimed in claim 1 wherein said fuel system comprises a device for energizing an air-fuel mixture of said engine, said device for energizing the air-fuel mixture comprises an air-fuel pipe, electrodes of positive and negative polarity having electro-feeding to produce an electro-current in the air-fuel mixture, and magnets to interact with said electro-current for ionizing said air-fuel mixture so as to improve the efficiency of combustion of said air-fuel mixture, said electrodes being formed in a cylindrical shape inside and along said air-fuel pipe, said electrodes and magnets arranged so as to produce a magnetohydrodynamic acceleration of said air-fuel mixture.

6. An automobile for racing as claimed in claim 1 wherein said exhaust system comprises a cleaning device-muffler for filtering exhaust emissions from the internal combustion engine and for eliminating noise, said cleaning device-muffler comprising a container having exhaust gas inlet means associated with one end of said container and treated gas outlet means associated with the other end of said container, said container comprising at least two separate chambers, each of said chambers comprising an absorbing filter and an adsorbing filter, said cleaning device-muffler arranged such that said exhaust gases are force to pass through said absorbing and adsorbing filters in the first chamber and to pass through said adsorbing and absorbing filters in the second chamber before exiting said container, said absorbing filters are adapted to remove detrimental matter such as carbon and lead from said exhaust gases, said adsorbing filters are adapted to decompose hydrocarbons of said exhaust gases by means of catalytic action and to adsorb detrimental matter.

* * * * *